United States Patent
Pan et al.

(10) Patent No.: US 7,586,362 B2
(45) Date of Patent: Sep. 8, 2009

(54) LOW VOLTAGE CHARGE PUMP WITH REGULATION

(75) Inventors: Feng Pan, Fremont, CA (US); Jonathan H. Huynh, San Jose, CA (US); Qui Vi Nguyen, San Jose, CA (US)

(73) Assignee: SanDisk Corporation, Milpitas, CA (US)

(*) Notice: Subject to any disclaimer, the term of this patent is extended or adjusted under 35 U.S.C. 154(b) by 0 days.

(21) Appl. No.: 11/955,221

(22) Filed: Dec. 12, 2007

(65) Prior Publication Data
US 2009/0153230 A1    Jun. 18, 2009

(51) Int. Cl.
G05F 1/01    (2006.01)
(52) U.S. Cl. .............................. 327/537; 327/536
(58) Field of Classification Search ......... 327/534–537, 327/589
See application file for complete search history.

(56) References Cited

U.S. PATENT DOCUMENTS

| | | | |
|---|---|---|---|
| 3,697,860 A | 10/1972 | Baker | |
| 4,511,811 A | 4/1985 | Gupta | |
| 4,583,157 A | 4/1986 | Kirsch et al. | |
| 4,636,748 A | 1/1987 | Latham | |
| 4,736,121 A | 4/1988 | Cini et al. | |
| 4,888,738 A | 12/1989 | Wong et al. | |
| 5,392,205 A | 2/1995 | Zavaleta | |
| 5,436,587 A | 7/1995 | Cernea | |
| 5,508,971 A | 4/1996 | Cernea et al. | |
| 5,563,779 A | 10/1996 | Cave et al. | |
| 5,563,825 A | 10/1996 | Cernea et al. | |
| 5,568,424 A | 10/1996 | Cernea et al. | |
| 5,592,420 A | 1/1997 | Cernea et al. | |
| 5,596,532 A | 1/1997 | Cernea et al. | |
| 5,621,685 A | 4/1997 | Cernea et al. | |
| 5,625,544 A | 4/1997 | Kowshik et al. | |
| 5,693,570 A | 12/1997 | Cernea et al. | |
| 5,969,565 A | 10/1999 | Naganawa | |
| 5,973,546 A | 10/1999 | Le et al. | |
| 6,018,264 A | 1/2000 | Jin | |
| 6,023,187 A | 2/2000 | Camacho et al. | |

(Continued)

FOREIGN PATENT DOCUMENTS

WO    WO 01/06336 A1    1/2001

OTHER PUBLICATIONS

Feng Pan et al., "Charge Pump Circuit Design", McGraw-Hill, 2006, 26 pages.

(Continued)

Primary Examiner—Dinh T. Le
(74) Attorney, Agent, or Firm—Davis Wright Tremaine LLP

(57) ABSTRACT

Techniques of providing a low output voltage, high current capability charge pump are given. The charge pump has multiple capacitors along with switching circuitry. In an initialization phase, the first plate of each of the capacitors is connected to receive a regulator voltage and the second plate of each capacitor is connected to ground. In a transfer phase, the capacitors are connected in series, where, for each capacitor after the first, the second plate is connected to the first plate of the preceding capacitor in the series. The output voltage of the pump is from the first plate of the last capacitor in the series. Regulation circuitry generates the regulator voltage from a reference voltage to have a value responsive to the output voltage level of the pump.

7 Claims, 2 Drawing Sheets

U.S. PATENT DOCUMENTS

| | | | |
|---|---|---|---|
| 6,026,002 A | 2/2000 | Viehmann | |
| 6,134,145 A | 10/2000 | Wong | |
| 6,154,088 A | 11/2000 | Chevallier et al. | |
| 6,198,645 B1 * | 3/2001 | Kotowski et al. | 363/59 |
| 6,249,898 B1 | 6/2001 | Koh et al. | |
| 6,314,025 B1 | 11/2001 | Wong | |
| 6,329,869 B1 | 12/2001 | Matano | |
| 6,344,959 B1 | 2/2002 | Milazzo | |
| 6,344,984 B1 | 2/2002 | Miyazaki | |
| 6,370,075 B1 | 4/2002 | Haeberli et al. | |
| 6,404,274 B1 | 6/2002 | Hosono et al. | |
| 6,424,570 B1 | 7/2002 | Le et al. | |
| 6,445,243 B2 * | 9/2002 | Myono | 327/536 |
| 6,486,728 B2 | 11/2002 | Kleveland | |
| 6,518,830 B2 | 2/2003 | Gariboldi et al. | |
| 6,525,949 B1 | 2/2003 | Johnson et al. | |
| 6,531,792 B2 * | 3/2003 | Oshio | 307/109 |
| 6,556,465 B2 | 4/2003 | Wong et al. | |
| 6,577,535 B2 | 6/2003 | Pasternak | |
| 6,606,267 B2 | 8/2003 | Wong | |
| 6,724,241 B1 | 4/2004 | Bedarida et al. | |
| 6,734,718 B1 | 5/2004 | Pan | |
| 6,760,262 B2 | 7/2004 | Haeberli et al. | |
| 6,798,274 B2 | 9/2004 | Tanimoto | |
| 6,834,001 B2 * | 12/2004 | Myono | 363/60 |
| 6,859,091 B1 | 2/2005 | Nicholson et al. | |
| 6,891,764 B2 | 5/2005 | Li | |
| 6,922,096 B2 | 7/2005 | Cernea | |
| 6,944,058 B2 | 9/2005 | Wong | |
| 6,975,135 B1 | 12/2005 | Bui | |
| 6,990,031 B1 | 1/2006 | Hashimoto et al. | |
| 7,023,260 B2 | 4/2006 | Thorp et al. | |
| 7,030,683 B2 | 4/2006 | Pan et al. | |
| 7,113,023 B2 | 9/2006 | Cernea | |
| 7,116,155 B2 | 10/2006 | Pan | |
| 7,120,051 B2 | 10/2006 | Gorobets | |
| 7,135,910 B2 | 11/2006 | Cernea | |
| 7,227,780 B2 | 6/2007 | Komori et al. | |
| 7,239,192 B2 | 7/2007 | Tailliet | |
| 7,276,960 B2 | 10/2007 | Peschke | |
| 7,397,677 B1 | 7/2008 | Collins et al. | |
| 2005/0248386 A1 | 11/2005 | Pan et al. | |
| 2006/0114053 A1 | 6/2006 | Sohara et al. | |
| 2007/0001745 A1 | 1/2007 | Yen | |
| 2007/0126494 A1 | 6/2007 | Pan | |
| 2007/0139099 A1 | 6/2007 | Pan | |
| 2007/0139100 A1 | 6/2007 | Pan | |
| 2007/0229149 A1 | 10/2007 | Pan et al. | |
| 2008/0024096 A1 | 1/2008 | Pan | |
| 2008/0157852 A1 | 7/2008 | Pan | |
| 2008/0157859 A1 | 7/2008 | Pan | |
| 2008/0239802 A1 | 10/2008 | Thorpe | |
| 2008/0239856 A1 | 10/2008 | Thorpe | |

OTHER PUBLICATIONS

Louie Pylarinos et al., "Charge Pumps: An Overview", Department of Electrical and Computer Engineering University of Toronto, 7 pages.

Ang et al., "An On-Chip Voltage Regulator Using Switched Decoupling Capacitors," 2000 IEEE International Solid-State Circuits Conference, 2 pages.

Notification of Transmittal of the International Search Report and the Written Opinion of the International Searching Authority, or the Declaration, International Application No. PCT/US2008/085827 mailed Apr. 24, 2009, 12 pages.

* cited by examiner

Charging Half Cycle

Transfer Half Cycle

LOW VOLTAGE CHARGE PUMP WITH REGULATION

FIELD OF THE INVENTION

This invention pertains generally to the field of charge pumps and more particularly to a charge pump with relative low output voltage, high power efficiency and higher current requirements.

BACKGROUND

Charge pumps use a switching process to provide a DC output voltage larger than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to reduce the amount of layout area and the current consumption requirements of pumps.

SUMMARY OF THE INVENTION

A charge pump for generating an output voltage is described. The charge pump has multiple capacitors along with switching circuitry. The capacitors are alternately connectable in a first, or initialization, phase and a second, or transfer, phase. In the first phase, the first plate of each of the capacitors is connected to receive a regulator voltage and the second plate of each capacitor is connected to ground. In the second phase, the capacitors are connected in series, where for each capacitor after the first the second plate is connected to the first plate of the preceding capacitor in the series. The output voltage of the pump is from the first plate of the last capacitor in the series. Regulation circuitry generates the regulator voltage from a reference voltage to have a value responsive to the output voltage level of the pump.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

The charge pump presented here particularly suitable for applications where high efficiency, minimal layout area requirements, and high current ability are preferred. The exemplary embodiments are suitable to provide outputs in the range of 3V to 6.5 V, with high output current capability, while requiring less layout area and current consumption than is found in the prior art. As example of an application for the described designs is for use as peripheral circuitry on a non-volatile memory circuit.

More information on prior art charge pumps, such Dickenson type pumps and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,922,096; and 7,135,910; and application Ser. Nos. 10/842,910 filed on May 10, 2004; 11/295,906 filed on Dec. 6, 2005; 11/303,387 filed on Dec. 16, 2005; 11/497,465 filed on Jul. 31, 2006; 11/523,875 filed on Sep. 19, 2006; and 11/845,903 and 11/845,939, both filed Aug. 28, 2007.

Figure 1A:
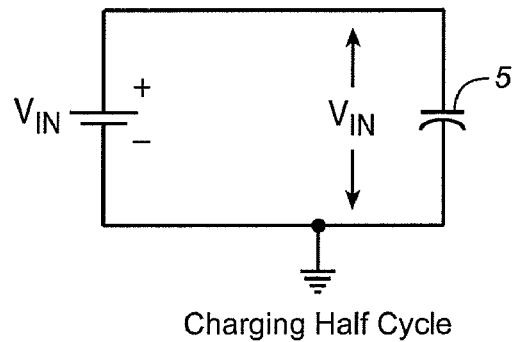
FIG. 1a is a simplified circuit diagram of the charging half cycle in a generic charge pump.
Figure 1B:
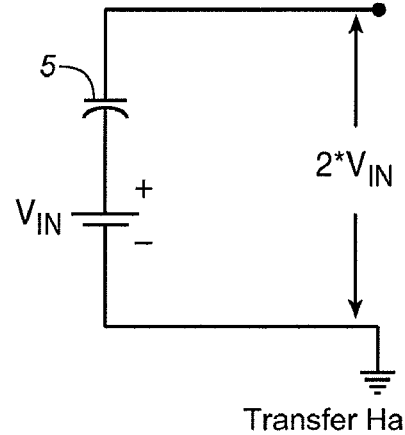
FIG. 1b is a simplified circuit diagram of the transfer half cycle in a generic charge pump.
Figure 2:
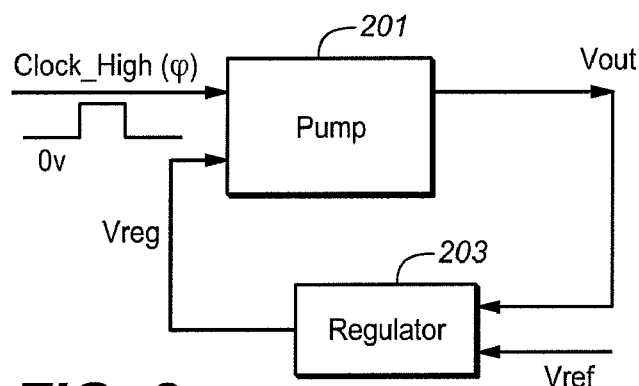
FIG. 2 is a top-level block diagram for a regulated charge pump.

FIG. 2 is a top-level block diagram of a typical charge pump arrangement. The designs described here differ from the prior art in details of how the pump section 201. As shown in FIG. 2, the pump 201 has as inputs a clock signal and a voltage Vreg and provides an output Vout. The high (Vdd) and low (ground) connections are not explicitly shown. The voltage Vreg is provided by the regulator 203, which has as inputs a reference voltage Vref from an external voltage source and the output voltage Vout. The regulator block 203 regulates the value of Vreg such that the desired value of Vout can be obtained. The pump section 201 will typically have cross-coupled elements, such at described below for the exemplary embodiments. (A charge pump is typically taken to refer to both the pump portion 201 and the regulator 203, when a regulator is included, although is some usages "charge pump" refers to just the pump section 201.)

Vref is a fixed reference value, such as provided by bandgap generator (not shown) with a voltage of, say, 1.2 volts, or other external voltage supply source. Clock_High is a clock (not shown) input to the Pump 201. The "1" voltage level of Clock_High ($\phi$) should preferably be high enough to minimize the drop across the switches used for charge transfer.

FIGS. 3A, 3B and 4A, 4B, show a pair of exemplary embodiments. In both cases, a number of capacitors (N, taken as N=3 for this discussion) are connected in series in the transfer phase or mode, while in the initialization phase or mode each capacitor is connected between the low voltage level (typically ground) and the regulator voltage. The regulator voltage is provided from a regulator circuit based on feedback and can be used to control the pre-charge on each of the internal stage node.

Figure 3A:
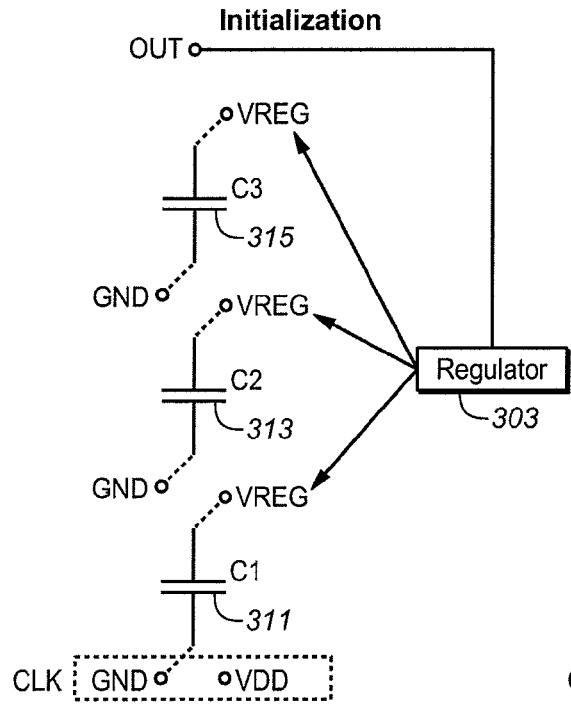
FIGS. 3A and 3B show the initialization and transfer modes of a first charge pump embodiment.
Figure 3B:
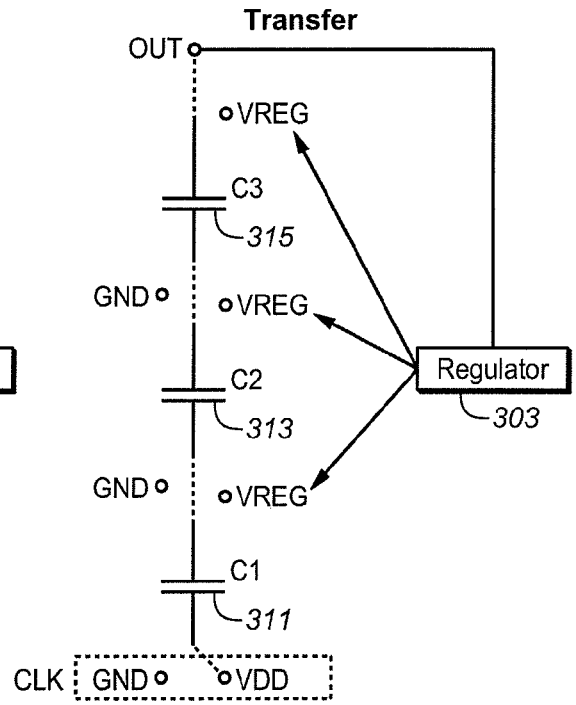

FIGS. 3A and 3B respectively show the initialization phase and the transfer phase of a first embodiment of a charge pump. The number of stages, N, shown in the examples is N=3, as this is convenient, but it will be understood that other numbers can be used as appropriate. For the initialization phase of FIG. 3A, the "bottom" plate of each capacitor (C1 311, C2 313, C3 315) is set to 0V, while the "top" plate is reset to a level based on the regulated voltage Vreg. The regulator 303 will supply Vreg, where the switches to effect this based on the clock signal CLK are only shown schematically. Both the switches and the regulator circuitry can be implemented by the standard techniques known in the art.

The second operating phase, or transfer phase, is shown is shown in FIG. 3B. The N stages are now connected in series between the Vdd level from the voltage supply and the output node to supply the output. This output is also supplied to the regulator 303, so that regulation feedback can be used to control the pre-charge level on the internal stage nodes (as described with respect to FIG. 3A), while the clock can run constantly at the Vdd level. The output is then boosted to Vout=N*K*Vreg+Vdd, K is a factor based upon charge sharing efficiency in operation. This is the ideal level ignoring any drops across the switches (again only indicated schematically). Preferably, the switches are driven by a level to minimize any drops from them. By using a regulating voltage to pre-charge the top plate during the initialization phase, rather than just applying Vdd to the top plate, a regulated output can be obtained while achieving the high power efficiency and high current requirements of the series arrangement of FIG. 3B.

Figure 4A:
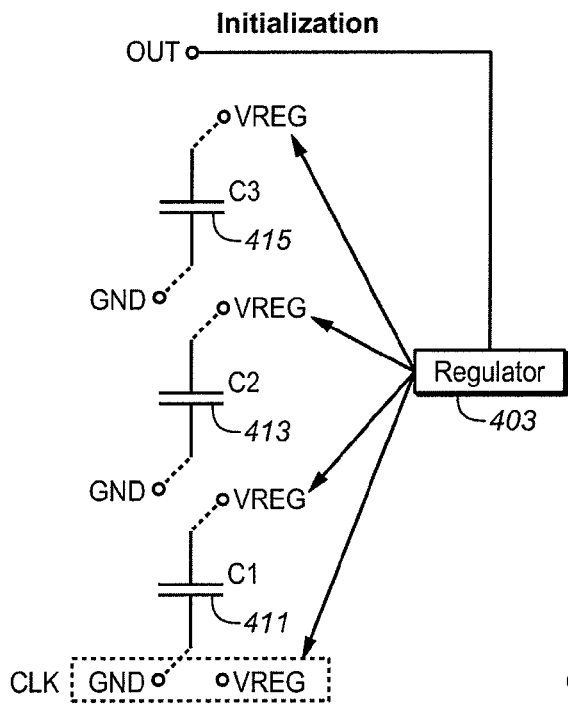
FIGS. 4A and 4B show the initialization and transfer modes of an alternate charge pump embodiment.
Figure 4B:
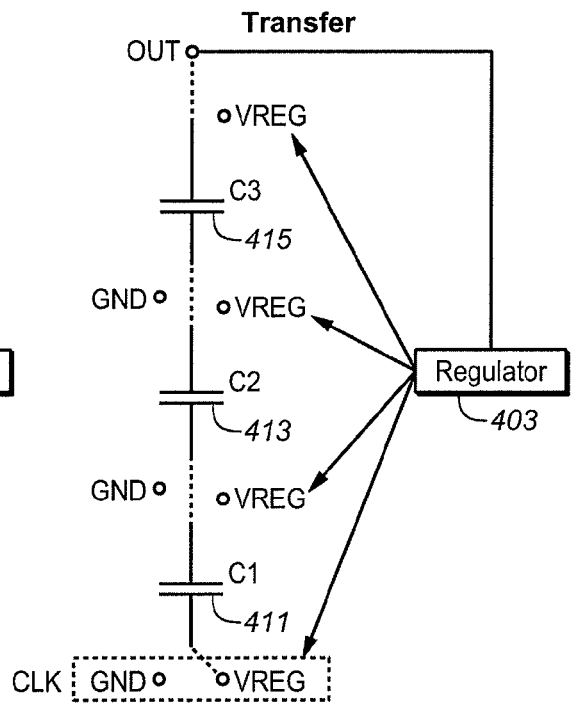

FIGS. 4A and 4B respectively show the initialization phase and the transfer phase of an alternate embodiment of a charge pump. The various elements are labeled similarly, and function similarly, to those of FIGS. 3A and 3B. The principle distinction is that the regulation feedback can now be used to control the pre-charge level on the internal stage nodes as well as the clock amplitudes. In the transfer phase of FIG. 4B, the capacitors are now connected in series between Vreg, rather than Vdd, and the output node. Consequently, the output voltage is now (ideally) boosted up to Vout=N*K*Vreg+Vreg. This allows all of the out voltage to be regulated by the feedback from the regulator circuit 403.

Although the arrangements of FIGS. 3A, 3B and 4A, 4B are described for the case of generating a positive voltage output, a similar arrangement can be used to generate negative voltages. More specifically, this could be effected by, roughly speaking, turning "upside down" the embodiments of FIGS. 3A, 3B and 4A, 4B with respect to their various connections and using a corresponding negative regulation voltage.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A charge pump circuit to generate an output voltage, including:
    a plurality of capacitors, each having a first plate and a second plate;
    switching circuitry, whereby the capacitors are alternately connectable in a first phase, in which the first plate of each of the capacitors is connected to receive a regulator voltage and the second plate of each of the capacitors is connected to ground, and in a second phase, in which the capacitors are connected in series such that for each capacitor after the first in the series the second plate is connected to the first plate of the preceding capacitor in the series and the first plate of the last capacitor in the series is connected to supply the output voltage of the charge pump circuit; and
    regulation circuitry connectable to receive a reference voltage and the output voltage from charge pump and to generate from the reference voltage said regulator voltage, wherein the regulator voltage value is responsive to the value of the output voltage.

2. The charge pump circuit of claim 1, wherein, during the second phase, the second plate of the first capacitor in the series is connected by the switching circuitry to receive a voltage from a voltage supply.

3. The charge pump circuit of claim 1, wherein, during the second phase, the second plate of the first capacitor in the series is connected by the switching circuitry to receive the regulator voltage.

4. The charge pump circuit of claim 1, wherein the charge pump circuit is formed on a non-volatile memory circuit as a peripheral circuitry element.

5. A method of generating an output voltage, comprising:
    providing a plurality of capacitors, each having a first plate and a second plate;
    alternately connecting the capacitors in a first phase and a second phase, where the first phase includes:
        connecting the first plate of each of the capacitors to receive a regulator voltage; and
        connecting the second plate of each of the capacitors to ground;
    and the second phase includes:
        connecting the capacitors in series such that for each capacitor after the first in the series the second plate is connected to the first plate of the preceding capacitor in the series; and
        supplying the output voltage from the first plate of the last capacitor in the series;
    generating said regulation voltage from a reference voltage wherein the regulator voltage value is responsive to the value of the output voltage.

6. The method of claims 5, the second phase further comprising:
    connecting the first capacitor in the series to receive a voltage from a voltage supply.

7. The method of claims 5, the second phase further comprising:
    connecting the first capacitor in the series to receive the regulator voltage.

* * * * *

UNITED STATES PATENT AND TRADEMARK OFFICE
CERTIFICATE OF CORRECTION

| | | |
|---|---|---|
| PATENT NO. | : 7,586,362 B2 | Page 1 of 1 |
| APPLICATION NO. | : 11/955221 | |
| DATED | : September 8, 2009 | |
| INVENTOR(S) | : Pan et al. | |

It is certified that error appears in the above-identified patent and that said Letters Patent is hereby corrected as shown below:

In Claim 5, Col. 4:

Line 33, insert -- of a charge pump -- after "voltage".

Line 34, insert -- the charge pump having -- after "providing".

Line 48, insert -- and -- after "series".

Line 49, replace "regulation" with -- regulator -- and "wherein the" with -- and said output voltage, wherein a --.

Line 50, replace "the value" with -- a value --.

Signed and Sealed this
Fifth Day of July, 2011

David J. Kappos
*Director of the United States Patent and Trademark Office*